Oct. 29, 1929.  E. H. LAWRENCE  1,733,308
VEHICLE WHEEL
Filed June 1, 1928
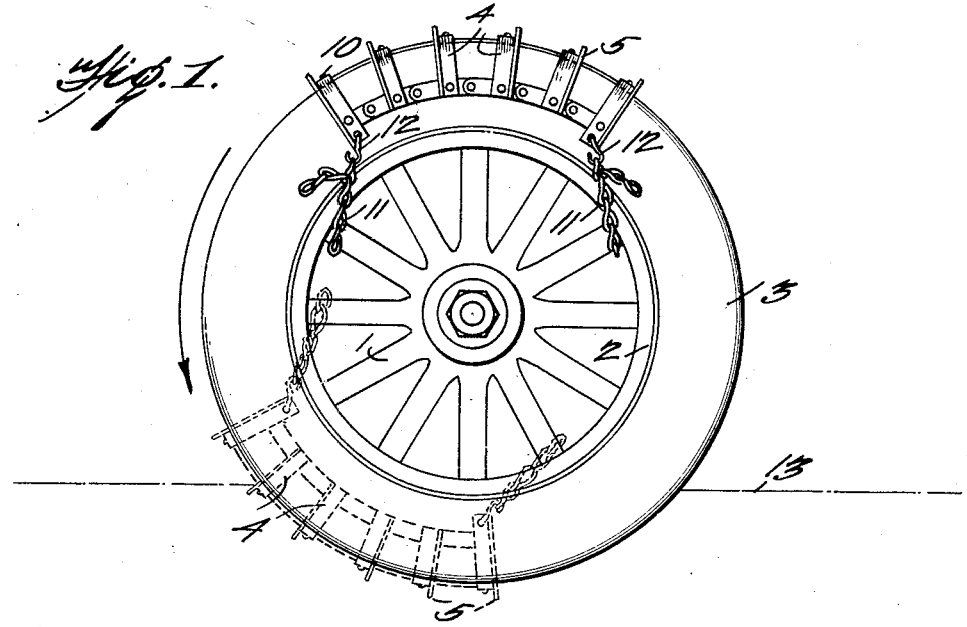
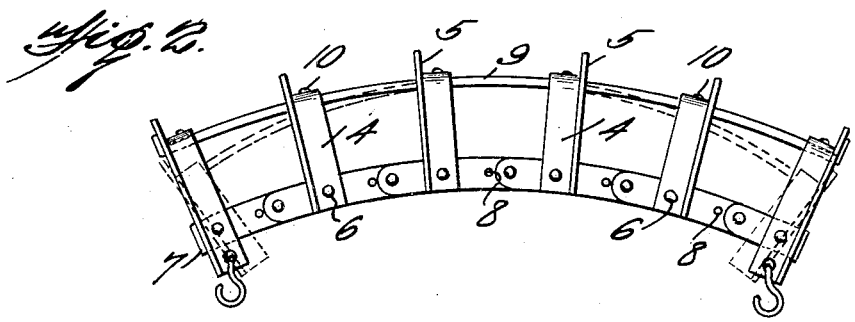
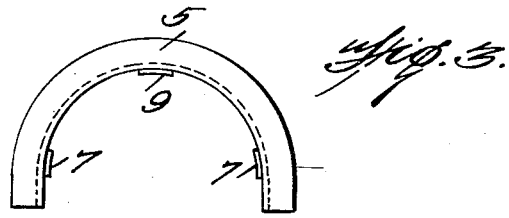
INVENTOR
E. H. LAWRENCE,
BY
ATTORNEY Patented Oct. 29, 1929

1,733,308

UNITED STATES PATENT OFFICE

EDWARD H. LAWRENCE, OF FORTSON, WASHINGTON, ASSIGNOR OF ONE-HALF TO WILLIAM H. LOAT, OF KING COUNTY, WASHINGTON

VEHICLE WHEEL

Application filed June 1, 1928. Serial No. 282,164.

This invention relates to traction appliances for wheels of power driven vehicles.

The principal object of my invention is to provide a device of this character which can be quickly and conveniently mounted upon a traction wheel or wheels of a power driven vehicle in cases where the road surface does not afford sufficient traction to propel the vehicle, such for example as a sandy, muddy, or other slippery surface.

A further object of my invention is to provide an appliance that may be secured to any part of the periphery of the tire, thereby avoiding the necessity of jacking up the wheel, such as is necessary in applying a traction chain or the like.

A still further object of my invention is to provide a traction appliance that can be easily and quickly applied to the wheel or wheels of a power driven vehicle, thus avoiding the necessity of soiling the hands and clothing of the operator as usually is the case when applying the well known type of traction chains.

I accomplish these and other objects of my invention by the peculiar arrangement and combination of the parts as will be more fully hereinafter described and explained in the following specification, shown in the accompanying drawings, and finally pointed out in the appended claims.

In the drawings:

Figure 1 is a side elevation of the driving wheel of the vehicle with my device applied thereto.

Figure 2 is an enlarged detailed side elevation of my appliance.

Figure 3 is an end elevation of the appliance.

Referring now more particularly to the drawings, like numerals will be used to indicate like parts throughout the different views, the numeral 1 indicating the spokes of a wheel, 2 its felloe, 3 the tire which is in this illustration of the invention, of a pneumatic type, all of which are of the well known type and construction.

The numeral 4 indicates one of a series of semi-circular members, one of whose edges is upturned, as at 5. The free ends of each of the members 4 are secured by means of rivets 6 to a flat member 7, of which there are a series pivotally joined together, as at 8. 9 indicates a flat member which is relatively thin and preferably has some inherent spring and to which each of the semi-circular members 4 is secured intermediate its free ends by means of rivets 10. Fastening chains adapted to secure the traction appliance to the periphery of the pneumatic tire are indicated by the numeral 11. Each of the chains has one end permanently secured to one of the semi-circular members 4. 12 indicates hooks which are pivotally secured to the members 4 for receiving the free ends of the chains.

The operation of the device can be clearly understood by referring to Figure 1 of the drawings. Assuming that the wheel has passed into a muddy road surface, as indicated at 13, with a resultant destruction of traction for the wheel,—all that is necessary for the operator to do is to place the appliance upon the wheel in its position as plainly shown, pass the free ends of the chains 11 beneath the spokes 1, thence upwardly until one of the links of the chains can be passed over the hooks 12. The operator now starts the engine of the vehicle which of course will cause the wheel to rotate in the direction of the arrow in Figure 1, affording no traction at first until the wheel has revolved sufficiently to bring my appliance into its position as shown in dotted lines in Figure 1. As the wheel continues to revolve, the upturned edges 5 of the semi-circular members 4 go deeper and deeper into the mud until they finally contact with more or less solid earth. This, of course, instantly gives traction to the wheels and takes the vehicle out of the mud and towards the solid part of the road surface, when of course the wheel will again spin, but instantly bring the appliance around again to its dotted position, giving the vehicle further impetus and so on until the vehicle is firmly upon a good road surface, when the appliance may be as quickly removed as it was mounted in place.

In order to make the appliance adaptable to varying diameters of wheels within a wide range, I have provided the members 7 so that a wheel of about the diameter represented by the arc of the appliance will receive the appliance without any movement of the members 7 about their pivots 8, and if a wheel of very much smaller diameter is to be dealt with, the chains 11, upon being hauled up around the spokes, will cause the member 9 to yield and the members 7 to move about their pivots, thus accommodating the appliance to the diameter of the wheel.

In many cases, of course, the appliance needs to be secured to but one of the traction wheels, or if necessity requires, it can be applied to both of the driving wheels. The same is true in case of double wheeled vehicles such as automotive busses, trucks and the like; that is to say, where there are two pairs of driving wheels apart from each other.

It is to be understood that the member 9 not only retains the semi-circular member 4 in spaced relation, but also assists in removing the appliance from the tire, due to the upward movement of the spring therein.

While I have shown a particular form of embodiment of my invention, I am aware that many minor changes therein will readily suggest themselves to others skilled in the art without departing from the spirit and scope of my invention. I, therefore, desire to avoid being limited to the exact form of embodiment which I have herein shown and described.

What I claim to be new is:

1. A traction increasing device for use on a vehicle wheel comprising a plurality of spaced semi-circular members adapted to fit the outside of a pneumatic tire, links pivotally connecting the adjacent ends of the several members and a spring member connected to the center of each semi-circular member to conform the traction increasing device to the periphery of the tire and flexible elements secured to the ends of the spring member and adapted to be secured to the spokes of a wheel.

2. A traction increasing device for use on a vehicle wheel comprising a plurality of spaced semi-circular members adapted to fit the outside of a pneumatic tire, links pivotally connecting the adjacent ends of the several members and a spring member connected to the center of each semi-circular member to conform the traction increasing device to the periphery of the tire and chains secured to the outside semi-circular members adapted to be passed thru the spokes and thereby secure the device to the wheel.

In testimony whereof I affix my signature.

EDWARD H. LAWRENCE.